US011768645B2

(12) United States Patent
Chen et al.

(10) Patent No.: US 11,768,645 B2
(45) Date of Patent: Sep. 26, 2023

(54) PRINT RECORDING SYSTEM AND METHOD FOR CONTROLLING PRINT RECORDING SYSTEM

(71) Applicant: Hitachi Industrial Equipment Systems Co., Ltd., Tokyo (JP)

(72) Inventors: Huilin Chen, Tokyo (JP); Takahiro Takahashi, Tokyo (JP); Takashi Kawano, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 0 days.

(21) Appl. No.: 17/439,489

(22) PCT Filed: Feb. 20, 2020

(86) PCT No.: PCT/JP2020/006857
§ 371 (c)(1),
(2) Date: Sep. 15, 2021

(87) PCT Pub. No.: WO2020/195408
PCT Pub. Date: Oct. 1, 2020

(65) Prior Publication Data
US 2022/0156022 A1 May 19, 2022

(30) Foreign Application Priority Data
Mar. 22, 2019 (JP) .................. 2019-054970

(51) Int. Cl.
*G06F 3/12* (2006.01)
*G06K 15/02* (2006.01)
(52) U.S. Cl.
CPC .......... *G06F 3/1257* (2013.01); *G06F 3/1204* (2013.01); *G06K 15/1805* (2013.01); *G06K 15/1818* (2013.01)

(58) Field of Classification Search
CPC combination set(s) only.
See application file for complete search history.

(56) References Cited

U.S. PATENT DOCUMENTS

| 5,960,449 A | * | 9/1999 | Nagaoka | H04L 67/1095 704/10 |
| 6,477,589 B1 | * | 11/2002 | Suzuki | H04L 12/40052 710/10 |

(Continued)

FOREIGN PATENT DOCUMENTS

| JP | 2001-92769 A | 4/2001 |
| JP | 2002-337315 A | 11/2002 |

(Continued)

OTHER PUBLICATIONS

International Search Report of PCT/JP2020/006857 dated Apr. 7, 2020.

(Continued)

*Primary Examiner* — Helen Zong
(74) *Attorney, Agent, or Firm* — MATTINGLY & MALUR, PC

(57) ABSTRACT

A print recording system, including: at least one print recording device; and a computer system that includes a database storing a plurality of print setting information items and is capable of sending and receiving data with respect to the print recording device. The computer system searches the print setting information corresponding to a search condition that is input from the database in accordance with the search condition, repeats the search in accordance with a new search condition when the print setting information does not match the search condition, and sends the print setting information obtained by the search or the repeated search to the print recording device to set the print recording device.

14 Claims, 11 Drawing Sheets

(56) References Cited

U.S. PATENT DOCUMENTS

| | | | |
|---|---|---|---|
| 2003/0115199 A1* | 6/2003 | Ochiai | G06F 16/248 |
| 2010/0123922 A1 | 5/2010 | Condello et al. | |
| 2014/0092409 A1 | 4/2014 | Ito | |
| 2016/0283179 A1* | 9/2016 | Mano | H04N 1/00127 |
| 2017/0068494 A1* | 3/2017 | Fukuda | G06F 3/1273 |
| 2020/0065324 A1* | 2/2020 | Watanabe | G06F 16/535 |
| 2021/0165613 A1* | 6/2021 | Krishna Raj | G06F 3/1285 |

FOREIGN PATENT DOCUMENTS

| | | |
|---|---|---|
| JP | 2012-252456 A | 12/2012 |
| JP | 2014-71583 A | 4/2014 |
| JP | 2017-54496 A | 3/2017 |

OTHER PUBLICATIONS

Extended European Search Report received in corresponding European Application No. 20778767.2 dated Dec. 15, 2022.

\* cited by examiner

FIG. 2

| SETTING ITEM | SETTING CONTENT |
|---|---|
| PRINT CONTENT | ABC123 |
| PRINT FORMAT INFORMATION | INDIVIDUAL SETTING/COLLECTIVE SETTING/FREE LAYOUT |
| CHARACTER HEIGHT | 0~99 |
| PARTICLE USE RATE | 1~16 |
| CHARACTER WIDTH | 0~3999 |
| CHARACTER POSTURE | 0:ABC →/1:ABC ←/2:CBA ←/3:CBA → |
| PRINT METHOD | 1: ORDER CONTROL/2: INTERSTAGE CONTROL/3: MIXED CONTROL |
| WRITE-OUT POSITION | 0~9999 |
| SPEED FOLLOW-UP | NONE/ENCODER TYPE/AUTOMATIC TYPE |
| TRANSPORT SPEED | 0~999 |
| NUMBER OF CONSECUTIVE TIMES | 0~9999 |
| CONSECUTIVE INTERVAL | 0~99999 |
| SENSOR OUT TIMER | 0~999 |
| SENSOR FILTER INFORMATION | TIME SETTING/UNTIL PRINT COMPLETION |
| TIME SETTING VALUE | 0~9999 |
| CHARGE ORDER CONTROL | NORMAL (ORDER CONTROL/INTERSTAGE CONTROL)/ORDER/INTERSTAGE MIXED CONTROL |
| INITIAL CHARACTER WIDTH CONTROL | DO NOT PERFORM/PERFORM |
| OFFSET OF CALENDAR OF YEAR AND MONTH | ONE DAY BEFORE SAME DAY/SAME DAY |
| DIN PRINT | DO NOT PERFORM/PERFORM |
| JAN COUNTRY CODE SETTING | CHARACTER INPUT/PRINT FORMAT |
| BARCODE PRINT | NORMAL/REVERSE |
| QR CODE ERROR CORRECTION LEVEL | M(15%)/Q(25%) |
| REVERSE SCAN PRINT | DO NOT PERFORM/PERFORM |
| HIGH-QUALITY MODE | INVALID/VALID |

| PRIORITY ORDER | SETTING ITEM | SETTING CONTENT |
|---|---|---|
| 1 | PRINT CONTENT | ABC123 |
| 2 | PRINT FORMAT INFORMATION | INDIVIDUAL SETTING |
| 3 | CHARACTER WIDTH | 1 |
| 4 | WRITE-OUT POSITION | 10 |
| 5 | CHARGE ORDER CONTROL | NORMAL (ORDER CONTROL/INTERSTAGE CONTROL) |

(B)

| PRIORITY ORDER | SETTING ITEM | SETTING CONTENT |
|---|---|---|
| 1 | PRINT CONTENT | ABC123 |
| 2 | PRINT FORMAT INFORMATION | INDIVIDUAL SETTING |
| 3 | CHARACTER WIDTH | 1 |
| 4 | WRITE-OUT POSITION | 10 |
|  |  |  |

FIG. 4
(A)
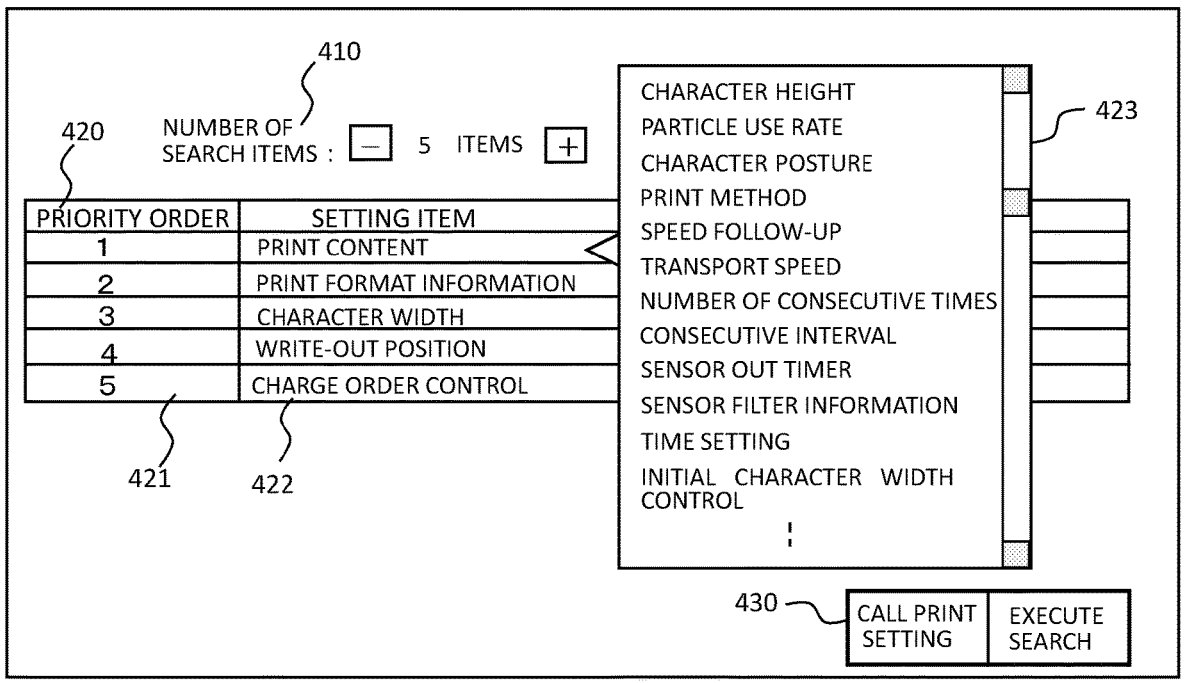
(B)
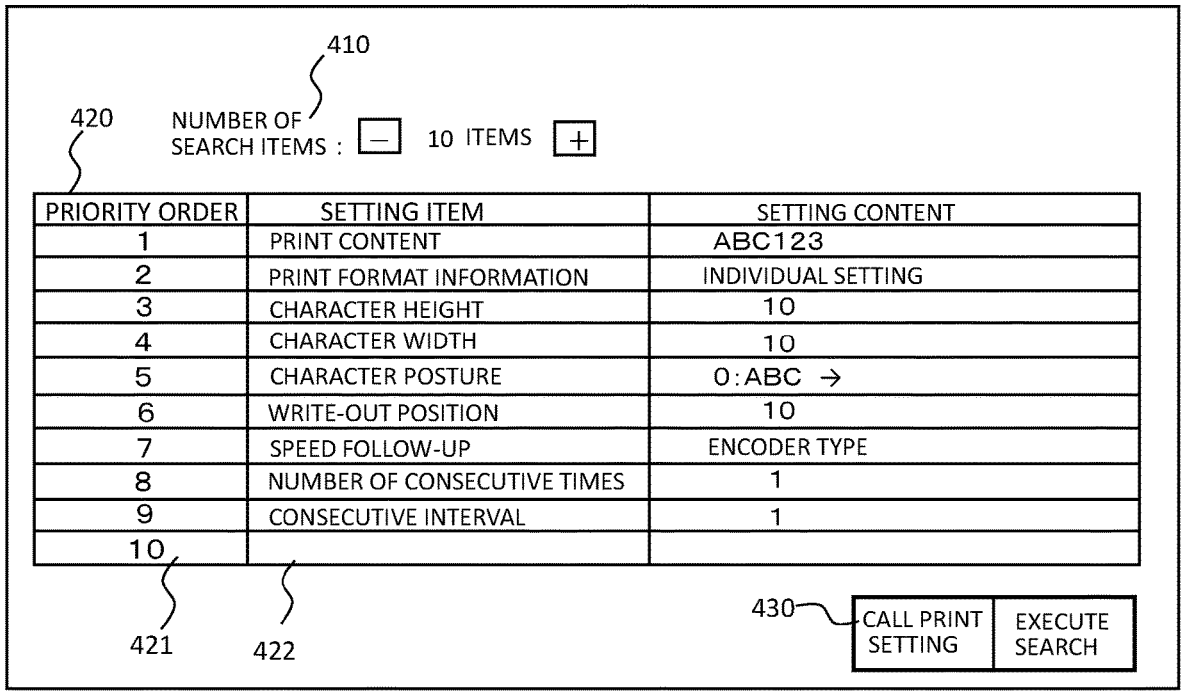

PRINT RECORDING SYSTEM AND METHOD FOR CONTROLLING PRINT RECORDING SYSTEM

TECHNICAL FIELD

The present invention relates to a print recording system and a method for controlling a print recording system.

BACKGROUND ART

A print recording device such as an ink jet recording device has been widely used in a production line or the like for industrial purpose. Such a print recording device prints information such as a product name, a manufacturing date, and an expiration date on manufactures transported through a line. It has been known that a print content is registered (stored) in advance in a server as a template, a necessary template is searched at the time of performing print, and print is performed by using the template. Such a technology, for example, is described in JP 2014-71583 A (Patent Document 1).

In the technology of Patent Document 1, when the created template is registered (stored) in the server, a keyword for facilitating the search of the template is generated, and the template and the keyword are stored in the server by being associated with each other. Then, in a case where print is performed, a manipulator inputs the keyword by a terminal manipulation, searches the server, and displays the corresponding template on a terminal device, and in the case of an intended template, the manipulator performs print by instructing the print recording device to perform print using the template.

CITATION LIST

Patent Document

Patent Document 1: JP 2014-71583 A

SUMMARY OF THE INVENTION

Problems to be Solved by the Invention

According to Patent Document 1 described above, the necessary template can be extracted by keyword search.

However, the template is information of the "print content" itself, and does not include various setting information items with respect to a print device that is necessary at the time of performing print. Even in a case where a content to be printed is determined in accordance with the template, in order for the print recording device to execute normal print, many setting operations with respect to the print recording device are necessary. For example, print quality greatly varies in accordance with a transport speed of a production line transporting a printed matter, a distance between a print head and the printed matter, a print posture, and the like. For this reason, when print is started, in order to make the print quality excellent, it is necessary to set setting items affecting the print quality to a suitable value. Such setting is performed by an operator with a manual manipulation, on the basis of the previous experience, in the current conditions, but such a setting operation is extremely complicated. In addition, a setting content is greatly changed in accordance with the degree of deftness of the operator, and thus, it is difficult to stably maintain excellent print quality.

Therefore, an object of the present invention is to provide a print recording system and a method for controlling a print recording system that enable print setting information to be easily set.

Solutions to Problems

The present invention, for example, is a print recording system, including: at least one print recording device; and a computer system that includes a database and is capable of sending and receiving data with respect to the print recording device, in which the computer system stores a plurality of print setting information items as the database, searches the print setting information corresponding to a search condition that is input from the database in accordance with the search condition, repeats the search in accordance with a new search condition when the searched print setting information does not match the search condition, and sends the print setting information to the print recording device when the print setting information obtained by the search or the repeated search is applied, and the print recording device is set on the basis of the sent print setting information.

Effects of the Invention

According to the present invention, it is possible to provide a print recording system and a method for controlling a print recording system that are capable of facilitating print setting.

BRIEF DESCRIPTION OF THE DRAWINGS

FIG. 2 is a diagram illustrating an example of print setting information.
FIG. 3 is a diagram illustrating an example of a search condition.
FIG. 4 is a diagram illustrating an example of a search condition input screen.

MODE FOR CARRYING OUT THE INVENTION

Hereinafter, the present invention will be described in detail on the basis of specific examples. In the following description, in principle, the same reference symbols (numerals) will be applied to the same device, the operation processing, and the like, and the description of a device and an operation that have been already described may be omitted in the description of the drawings described later. Note that, the present invention is not limited to the following examples.

Example 1

Figure 1:
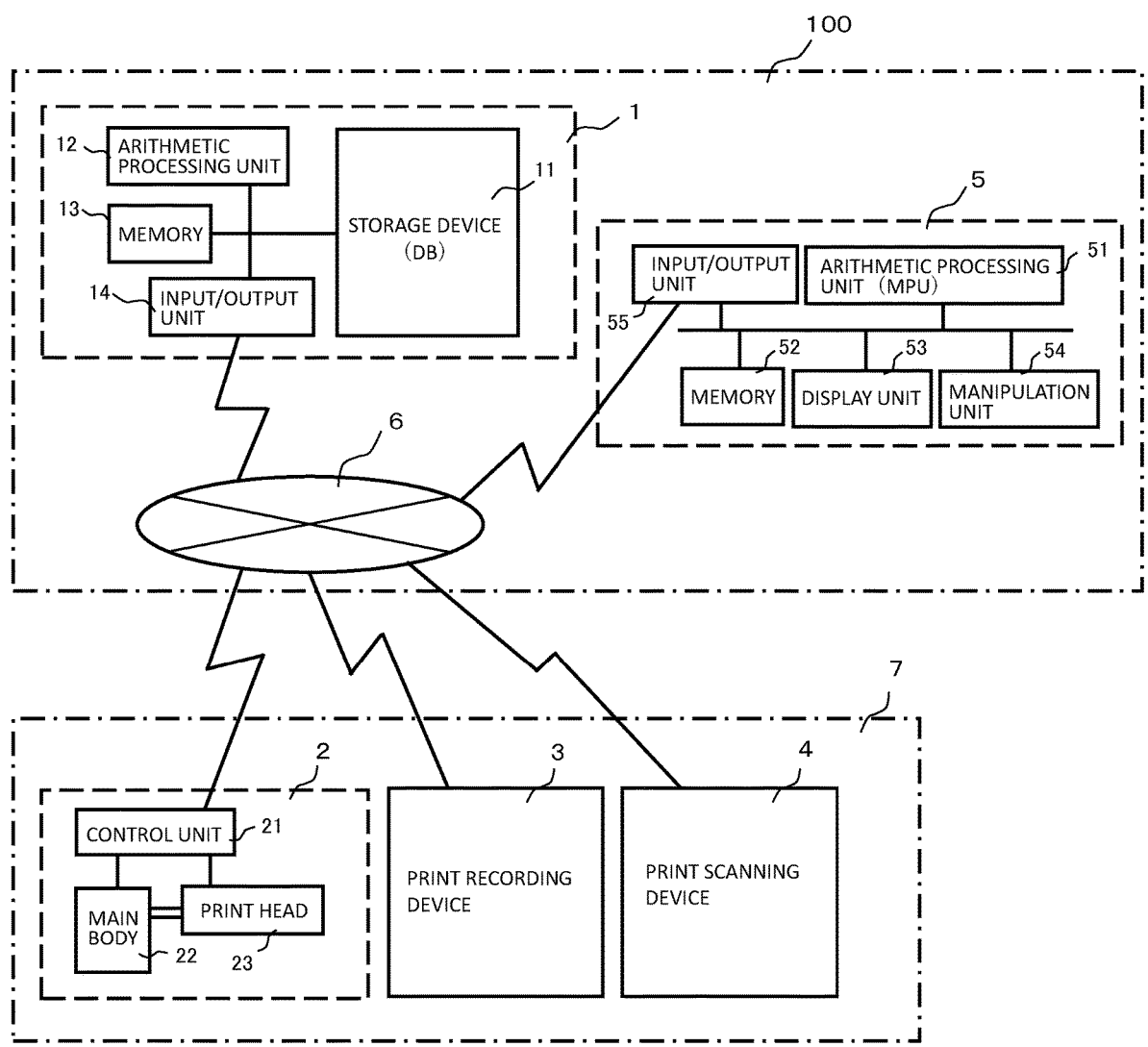
FIG. 1 is a configuration diagram of a print recording system in Example 1 of the present invention.
Figure 5:
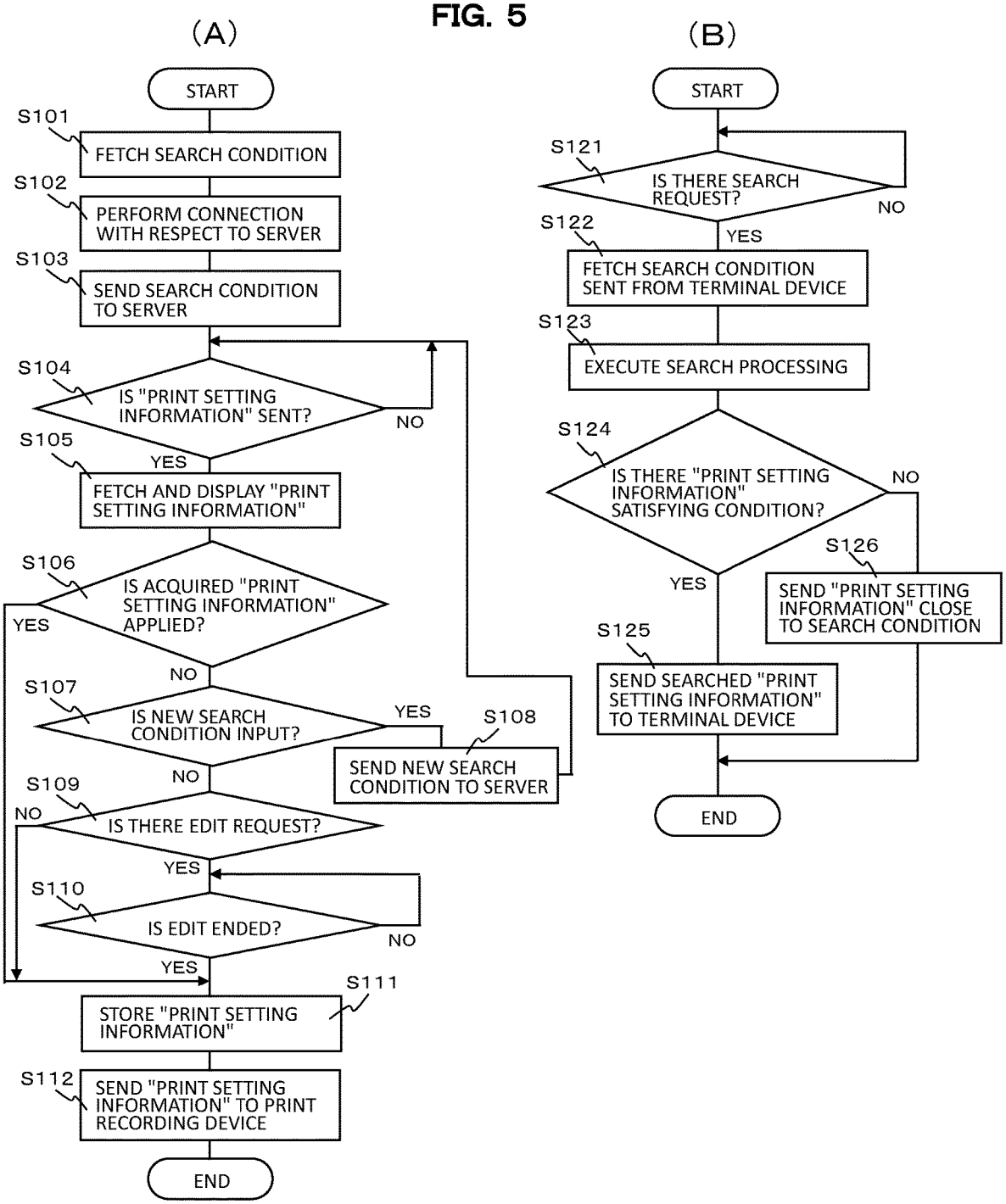
FIG. 5 is a diagram illustrating an operation flow in Example 1 of the present invention.

Next, Example 1 of the present invention will be described by using FIG. 1 to FIG. 5. FIG. 1 illustrates the configuration of a print recording system in Example 1 of the present invention. In FIG. 2, print setting information is exemplified. FIG. 3 is a diagram illustrating an example of a search condition that is used at the time of extracting the print setting information by search. FIG. 4 is an example of a screen for inputting the search condition. FIG. 5 is an operation flowchart describing the operation of the system in Example 1 of the present invention.

(Description of Configuration and Function of System)

First, the configuration of the print recording system in Example 1 of the present invention will be described by using FIG. 1.

In FIG. 1, 100 is a computer system provided with a database. In this example, the computer system 100 includes a server 1, a terminal device 5, and a network line 6 for performing communication between devices.

The server 1 is provided with a storage device 11 including the database that stores and retains a plurality of sets of print setting information items as illustrated in FIG. 2. In addition, the server 1 has an arithmetic processing function as a computer, and includes an arithmetic processing unit 12, a memory 13 storing a program for the arithmetic processing unit 12 to execute arithmetic processing, and an input/output unit 14 controlling the input of information or data that is sent from other devices into the server 1 or the output of the information or the data to the other devices through the network line 6. Note that, the network line 6 may be wired or wireless, and in this example, a local area network (LAN) is used. In addition, the server 1 inputs the search condition from the terminal device 5, searches print setting information corresponding to the requested search condition from the plurality of print setting information items in the database, and outputs (sends) the searched print setting information to the terminal device 5.

The terminal device 5 has a function as man-machine communication for a user (a manipulator) to use the system, a function of fetching information (data) that is input to perform an operation command of the server 1 or of receiving and storing information (data) such as the print setting information sent from the server 1, a function of sending the print setting information to print recording devices 2 and 3 when the print setting information to be set in the print recording devices 2 and 3 can be checked, and the like. A general-purpose computer (for example, personal computer) can be used as the terminal device 5. The terminal device 5 includes an arithmetic processing unit 51, a memory 52 storing a program for the arithmetic processing unit 51 to perform arithmetic processing or information (data) necessary for the arithmetic processing, and an input/output unit 55 controlling the input and the output of the information (the data). In addition, the terminal device 5 includes a display unit 53 and a manipulation unit 54 such as a keyboard, in order to perform communication with respect to the manipulator (the user of the system).

The print recording devices 2 and 3 are provided in a production line 7. In this example, the print recording devices 2 and 3 are an ink jet recording device. The print recording devices (the ink jet recording devices) 2 and 3 contain an ink for print in a main body 22, and supply the ink to a print head 23. The print head 23 particulates the ink, lands the ink that is charged and deflected by a charged electrode and a deflection electrode provided inside in a print target, and performs print. A control unit 21 executes control for print using the main body 22 and the print head 23. In addition, in this example, the control unit 21 inputs the print setting information that is sent from the terminal device 5, and executes a setting operation of the print recording device on the basis of the print setting information.

Note that, in this example, two print recording devices are provided, but at least one print recording device may be provided, and three or more print recording devices may be provided. In addition, in this example, the print recording device is the ink jet recording device, but may be other types of recording devices (for example, a laser printer).

A print scanning device 4 scans the printed content, and transmits (sends) a scanning result to the terminal device 5 through the network line 6.

The detailed operation content of the print recording system will be described below, but the outline is as follows. First, the manipulator inputs a search condition for searching desired print setting information to the terminal device 5 by manipulating the manipulation unit 54 while referring to display contents of the screen displayed on the display unit 53 of the terminal device 5. The terminal device 5 sends the search condition to the server 1, and the server 1 searches print setting information corresponding to the search condition and sends the searched print setting information to the terminal device 5. The terminal device 5 fetches the print setting information and displays the print setting information on the display unit 53. According to such display, the manipulator is capable of checking the content of the print setting information extracted by the search. The terminal device 5 waits for the check from the manipulator. In a case where the check from the manipulator (a setting permission command) is input, the terminal device 5 sends the print setting information to the print recording devices 2 and 3. The print recording devices 2 and 3 to which the print setting information is sent execute the setting of the print recording device on the basis of the print setting information.

(Specific Operation Content of System)

Next, a specific procedure until the print setting information is applied (the operation content) in Example 1 of the present invention will be described by using FIG. 3 to FIG. 5. FIG. 3 is a diagram illustrating an example of the search condition. FIG. 4 illustrates a screen example of inputting the search condition for searching the print setting information. FIG. 5 is a diagram illustrating a specific operation procedure of the system of FIG. 1. FIG. 5(A) illustrates an operation flow (a processing content) of the terminal device 5, and FIG. 5(B) illustrates an operation flow of the server 1.

First, an operation of inputting the search condition for searching the print setting information will be described. Such an operation is processing of step S101 in FIG. 5(A). In step S101, the manipulator inputs the search condition as illustrated in FIG. 3(A) to the terminal device 5 while watching the screen. A search condition input screen as illustrated in FIG. 4 is displayed on the display unit 53, and the manipulator manipulates the manipulation unit 54 while watching the screen and inputs the search condition, and thus, the input is executed. First, the terminal device 5 is started up, the manipulation unit 54 is manipulated, and the search condition input screen as illustrated in FIG. 4(A) is displayed on the display unit 53. In FIG. 4(A), in a case where "Call Print Setting" in a selection display 430 is selected, the terminal device 5 displays the screen. In a case where the screen is displayed, the manipulator inputs and designates the number 410 of search items (in this example, the number of items is 5). According to such designation, a table 420 in which five setting items can be input is displayed on the screen. In the table 420, there are a column 421 of a priority order and a column 422 of setting items. Note that, in a case where the plurality of print setting information items are set by the search, as illustrated in FIG. 4(B), the search is repeated by increasing the number of search items, and thus, more desired print setting information can also be extracted.

In principle, the manipulator selects and inputs the setting item in descending order of the priority order, in consideration of the importance of the search. 423 illustrates a content example of inputting a content to be input in each of the columns by pull-down. In a case where the input with respect to the condition input table 420 (the search condition) is completed, and then, the manipulator designates a "Execute Search" button in the selection display 430 of the screen, the terminal device 5 is capable of recognizing that the input of the search condition is completed and there is a search execution command. Such processing is step S101 in FIG. 5(A). In a case where the processing of step S101 is ended, the processing proceeds to step S102.

Next, in step S102, the terminal device 5 and the server 1 are connected to each other such that communication can be performed, the terminal device 5 executes step S103 of sending the search condition to the server 1 by checking that the communication can be performed. In a case where the processing of step S103 (the sending of the search condition) is ended, the processing proceeds to step S104, and the terminal device 5 waits for the response from the server 1.

On the other hand, as illustrated in step S121 of FIG. 5(B), the server 1 waits for a search request (a command) from the terminal device 5, and fetches the search condition in a case where there is the search request, as illustrated in step S122, and the processing proceeds to step S123. In step S123, search processing of the print setting information corresponding to (matching) the search condition is executed.

Next, in step S124, it is determined whether or not there is the print setting information satisfying (coincident with) the search condition (whether or not the print setting information satisfying the search condition exists) by the search. In step S124, in a case where there is the print setting information coincident with the search condition (in the case of YES), the processing proceeds to step S125. In a case where there is no print setting information that is completely coincident with the search condition (in the case of NO), the processing proceeds to step S126.

In step S125, the print setting information matching the search condition is sent to the terminal device 5. On the other hand, in step S126, print setting information that does not match the search condition but has a high coincidence degree, that is, print setting information close to the search condition is searched, and a search result (the print setting information) is sent to the terminal device 5.

Next, in step S104 (refer to FIG. 5(A)), the terminal device 5 waits for the print setting information to be sent from the server 1, and in a case where the print setting information is received, the processing proceeds to step S105.

In step S105, the sent print setting information is fetched, and the content thereof is displayed on the display unit 53. According to the display, the manipulator is capable of checking the content of the searched print setting data on the screen. The manipulator checks the displayed print setting information, and in a case where it is determined that there is no problem with the acquired (displayed) print setting information, the manipulation unit 54 instructs an input device to apply the print setting information. According to the instruction, the terminal device 5 performs the determination of step S107, and in a case where the print setting information is applied (in the case of YES), the processing proceeds to step S111. In step 111, the print setting information is stored. In a case where the manipulator is not satisfied with the content of the displayed print setting information (in the case of NO in step S106), the terminal device 5 recognizes that the manipulator has determined not to apply at least the displayed print setting information as it is, and the processing proceeds to step S107.

In step S107, the screen for the manipulator to set the search condition is displayed, and in a case where the manipulator inputs a novel search condition (new search condition) while watching the screen (in the case of YES in step S107), the processing proceeds to step S108. In step S108, the new search condition is sent to the server 1, and the repeat of the search (repeated search) is requested. The new search condition, for example, is set such that in the initial search, the search is performed in the search condition as illustrated in FIG. 3(A) (in this example, there are five setting items), and as illustrated in FIG. 3(B), an item with a low priority order is deleted (in FIG. 3(B), the fifth item is deleted). Alternatively, the novel search condition is set such that in a case where the plurality of print setting information items are searched in the search condition of FIG. 3(A), the number of search conditions is increased. According to the novel search condition, the search is repeated, and thus, desired print setting information can be searched. Note that, the condition with a low degree of priority is deleted from the original search condition, and thus, the new search condition can be efficiently set.

The server 1 that has received the new search condition executes processing of step S121 to step S126 (refer to FIG. 5(B)). The details thereof have been described above, and thus, will be omitted. The result of the repeated search (the print setting information) of the server 1 is sent to the terminal device 5.

In FIG. 5, the terminal device 5 determines whether or not there is the sending of the print information setting information to which the search is repeated in step S104, and in a case where there is the sending, the processing proceeds to step S105. The operation of step S105 to step S108 is as described above. As described above, such processing is continuously performed until the manipulator has no intention of repeating the search in accordance with the novel search condition.

In step S109 of FIG. 5(A), even in a case where the acquired print setting information is not coincident with the search condition, it is determined whether or not there is a request indicating an intention of using the information by changing a part thereof (an edit request). In step S109, in a case where there is the edit request (in the case of YES), the processing proceeds to step S110, and waits for the manipulator to end an edit operation. The manipulator performs the edit request, and then, performs the edit operation. In step S109, in a case where there is no edit request (in the case of NO), it is determined to use the acquired print setting condition even when the print setting condition is not completely coincident with the search condition. In principle, such determination is based on the instruction from the manipulator. Even in a case where there is no instruction from the manipulator, in a case where there is no instruction from the manipulator within a certain period of time, the processing may proceed to step S111.

In step S110, in a case where the edit operation is ended (in the case of YES), the processing proceeds to step S111. In step S111, the print setting information after the edit is stored in the terminal device. The storage can be attained by being stored in the memory 52 of the terminal device 5. That is, in a case where there is the print setting information coincident with the search condition (in the case of YES in step S105), the print setting information is stored, otherwise in a case where there is print setting information that can be applied (in the case of NO in step S109), the print setting information is stored. In addition, in a case where there is no print setting information completely coincident with the search condition, and a part of the print setting information close to the requested search condition is edited, the print setting information after the edit is stored (step S111).

Such storage is ended, and then, the processing proceeds to step S112.

Then, in step S112, the print setting information to be set (applied) is sent to the print recording devices 2 and 3.

The print recording devices 2 and 3 (refer to FIG. 1) fetch the print setting information sent from the terminal device 5 in the control unit 21, and the control unit 21 executes the setting for print on the basis of the print setting information.

Note that, in this example, the computer system 100 is set to a system provided with the server 1 and the terminal device 5 and is set to a distributed system in which the server 1 executes processing of inputting the search condition by the terminal device and of searching the print setting information corresponding to the search condition from the database, but the present invention is not limited to such a computer system. For example, the computer system may be a centralized system in which the database is constructed in a general storage device not having an arithmetic processing function, and the search processing using the search condition is executed by the terminal device, instead of providing the server. In such a centralized system, it is not necessary to send and receive the information and the data between the terminal device and the server, and thus, the terminal device may execute processing in which the processing of FIG. 5(A) and the processing of FIG. 5(B) are combined.

Effects of Example 1

According to Example 1 of the present invention described above, the manipulator is capable of taking out the print setting information to be set in the print recording device by performing the search on the basis of the search condition, and thus, the setting operation of the manipulator with respect to the print recording device is simplified, and the time required for the operation can be reduced. In addition, even in a case where there is no print setting information matching the search condition, the search can be repeated by changing the search condition, and more desired print setting condition information can be fetched in the terminal device. In addition, according to the search, the print setting information close to the search condition can be edited by manipulating the terminal device, and thus, print setting information with a higher accuracy can be obtained.

Example 2

Figure 6:
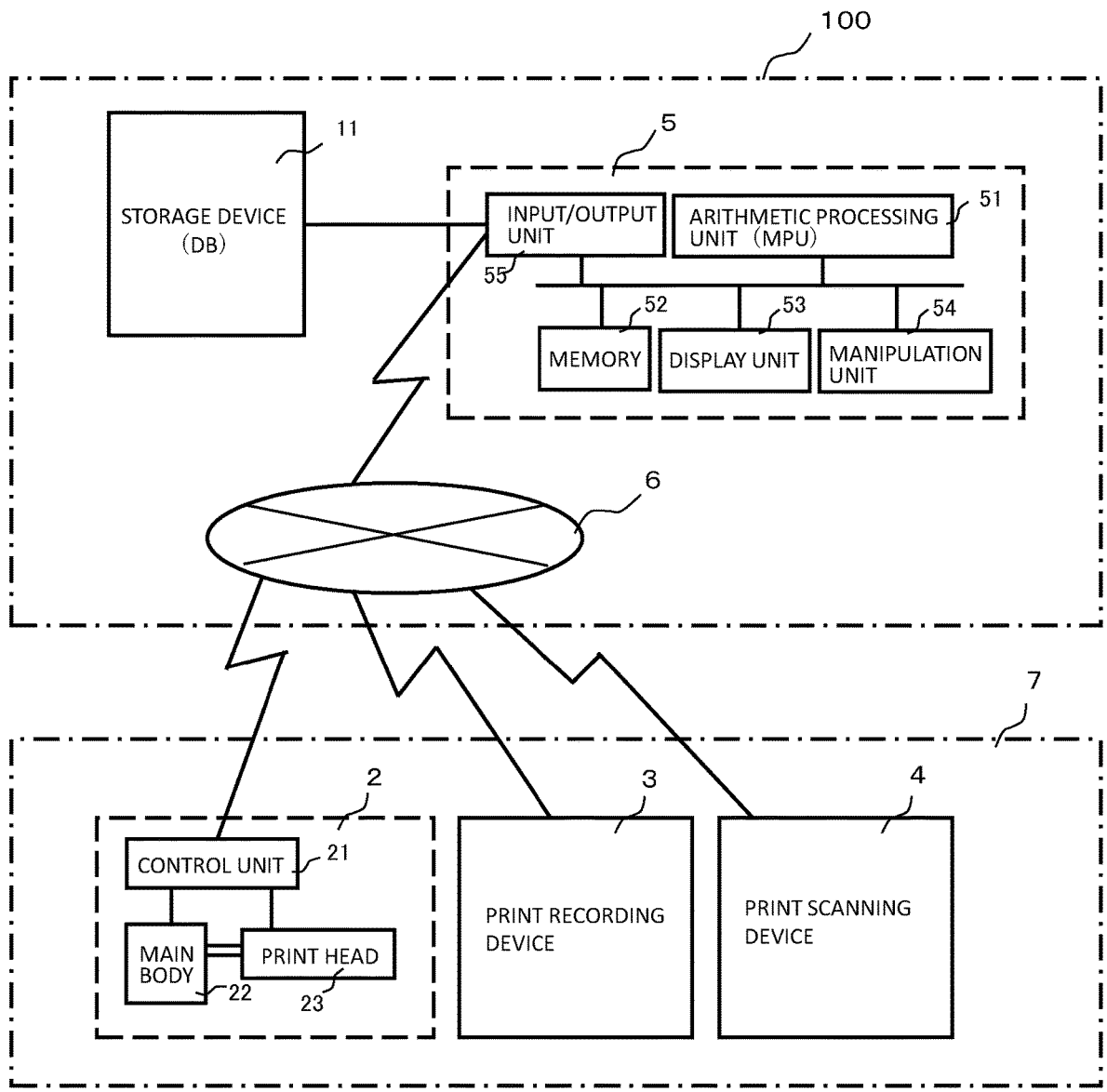
FIG. 6 is a configuration diagram of a print recording system in Example 2 of the present invention.
Figure 7:
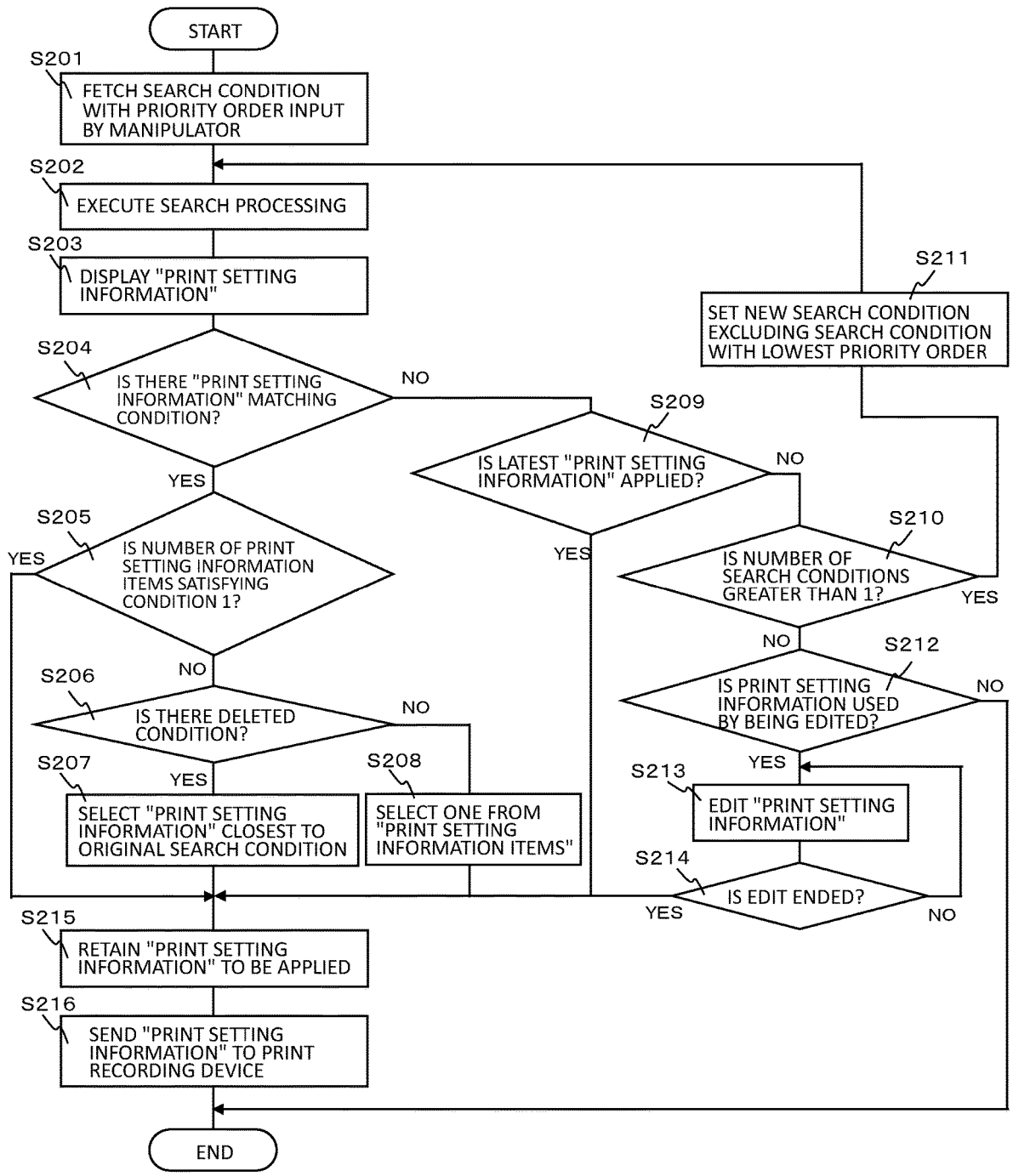
FIG. 7 is a diagram illustrating an operation flow in Example 2 of the present invention.

Next, Example 2 of the present invention will be described by using FIG. 6 and FIG. 7. FIG. 6 is a system configuration diagram in Example 2 of the present invention. FIG. 7 is an operation flowchart of Example 2.

(Description of Configuration and Function of System)

First, a system configuration in Example 2 will be described by using FIG. 6. The computer system 100 of FIG. 6 is a centralized system including the terminal device 5, the storage device 11, and the network line 6. In the respect, the system of FIG. 6 is different from the system of FIG. 1. In FIG. 6, the database including the plurality of print setting information items used in the setting of the print recording device is stored in the storage device 11. The other configurations are identical to those in FIG. 1, and thus, the description of the other configurations in FIG. 6 will be omitted. In addition, in Example 2, the fact that a search condition is the search condition with the priority order as illustrated in FIG. 3 is identical to that in Example 1, but a specific operation in a case where the print setting information coincident with the original search condition is not capable of being obtained (not capable of being searched) is different from that in Example 1. Here, the reason for setting the priority order is to acquire print setting information having many items coincident with setting values of designated print setting items even in a case where the print setting information of the setting values of the print setting items designated by the user does not exist (is not stored) in the storage device 11.

(Specific Operation Content of System)

Next, a specific operation content in Example 2 will be described by FIG. 7. FIG. 7 is an operation flowchart in Example 2 of the present invention.

First, in FIG. 7, in step S201, the terminal device 5 fetches the search condition with the priority order that is input through the manipulation unit 54 by the manipulator. Here, the search condition with the priority order is the search condition as illustrated in FIG. 3, and setting items and setting contents are registered in descending order of the priority order. The screen as illustrated in FIG. 4 is displayed on the display unit 53, and an input operation is performed by the manipulator manipulating the manipulation unit 54. The terminal device 5 fetches the search condition with the priority order (in this example, hereinafter, referred to as a "search condition"), and then, the processing proceeds to step S202.

In step S202, on the basis of the fetched search condition, the print setting information corresponding to the condition is searched. After the search, the processing proceeds to step S203, and the print setting information that is a search result is displayed on the display unit 53. According to such display, the manipulator is capable of grasping the content of the search result. After such display, the processing proceeds to step S204.

In step S204, it is determined whether or not the searched print setting information is content matching (coincident with) the search condition. In step S204, in a case where there is no print setting information matching the search condition (in the case of NO), the processing proceeds to step S209. In a case where there is the print setting information coincident with the search condition (in the case of YES), the processing proceeds to step S205.

Here, the processing of step S205 to step S208, step S215, and step S216 will be described below, and step S209 to step S214 will be described first.

First, in step S209, it is determined whether or not the print setting information displayed in step S203 is applied (is set in the print recording device). Such determination is performed by the manipulator inputting (instructing) a determination result from the manipulation unit 54. In a case where the manipulator inputs an instruction of applying the displayed print setting information, the processing proceeds to step S215, and the print setting information is retained. In step S209, in a case where an instruction of not applying the displayed print setting information is input (in the case of NO), the processing proceeds to step S210.

In step S210, it is determined whether or not the number of items of the search condition used in the search is "1". For example, in the case of the search condition illustrated in FIG. 3(A), there are five setting items, and thus, the number of search conditions is "5" in the initial search, and it is determined that the number of search conditions is greater than "1" (it is determined as YES). In this case, the processing proceeds to step S211. In step S211, the search condition with the lowest priority order is removed (deleted). For example, the fifth search condition with the lowest priority order is deleted from the search condition of FIG. 3(A) to be the search condition as illustrated in FIG. 3(B). As described above, an item with the lowest priority order is deleted to be a new search condition, and in order to repeat the search, the processing returns to step S202. Accordingly, the server 1 repeats the search in accordance with the new search condition by step S202. In step S210, in a case where the number of search conditions is "1"as a result of repeating the search several times (in the case of NO), the processing proceeds to step S212 without performing further search.

In step S212, it is determined whether or not the print setting information that is searched and displayed (refer to step S203) is used by being edited. The terminal device 5 waits for the determination from the manipulator, and determines that a determination result is input by the manipulator. In step S212, in a case where it is determined that the print setting information is not used (in the case of NO), the processing is ended. In a case where it is determined that the print setting information is used by being edited in step S212 (it is determined as YES), the edit operation of the print setting information is performed by step S213 and step S214. The edit operation is performed by the manipulator manipulating the manipulation unit 54 while watching the print setting information displayed on the screen of the display unit 53. In step S214, in a case where the terminal device 5 checks that the edit operation of the manipulator is ended (in the case of YES), the processing proceeds to step S215. In a case where the edit operation is not ended (in the case of NO), the processing returns to step S213. The content of the processing of step S215 and step S216 will be described below.

Next, an operation content of step S204 to step S208, step S215, and step S216 will be described.

In step S204, in a case where it is determined that the searched print setting information matches the search condition, the processing proceeds to step S205. In step S205, it is determined whether or not the number of existing print setting information items matching the search condition is greater than or equal to 2. This is because the plurality of print setting information items coincident with the search condition may exist. In the determination of step S205, in a case where the number of print setting information items matching the search condition is 1 (in the case of YES), the processing proceeds to step S215. In a case where the plurality of print setting information items exist (in the case of NO), the processing proceeds to step S206.

In step S206, it is determined whether or not it is the print setting information searched in accordance with the original search condition, in other words, whether or not it is the print setting information obtained as a result of performing the search by deleting the search condition. In step S206, in a case where it is the print setting information obtained by the initial search condition (in the case of NO), the processing proceeds to step S208. In step S208, in a case where the processing of step S208 of selecting one from the plurality of print setting information items is ended, the processing proceeds to step S215. Such selection is automatically performed by the designation from the manipulator or a selection rule set in advance in the terminal device.

On the other hand, in step S206, in a case where it is the print setting information obtained as the result of performing the search by deleting the search condition (in the case of YES), the processing proceeds to step S207.

In step S207, the print setting information closer to the original search condition is selected from the plurality of print setting information items. Such determination may be performed by calculating a match rate between the acquired data and the search condition in the terminal device 5, or may be designated by the manipulator. In a case where the terminal device 5 performs the determination, the print setting information data with the highest priority order and the smallest difference in the setting values is selected from the print setting items of the deleted search condition. In a case where the selection is performed in step S207, the processing proceeds to step S215.

As described above, in step S215, the print setting information to be applied is retained by the search or the determination operation described above. That is, in a case where there is the print setting information coincident with the search condition (YES in step S205 or in a case where one print setting information item is selected in step S208), the print setting information is retained and is used for setting the print recording device. In addition, in a case where the print setting information closest to the search condition is selected in step S207, the print setting information is retained. In addition, in a case where there is the print setting information edited by step S213, the print setting information after the edit is retained.

In step S215, the print setting information to be applied is retained once. After that, the processing proceeds to step S216. Then, in step S216, the print setting information that is set (that is applied) is sent to the print recording devices 2 and 3.

The print setting information sent from the terminal device 5 is fetched in the control unit 21 of the print recording devices 2 and 3, and the control unit 21 executes the setting on the basis of the print setting information.

As described above, the manipulator is capable of inputting the search condition in a priority sequence, and the computer system searches the intended data by performing the search in accordance with the search condition with the priority order, and thus, an operation of applying the print setting information to each of the print recording devices is simplified.

Note that, in Example 2, the system of FIG. 6 is used, but instead of this system, the print recording system illustrated in FIG. 1 can be used. In the case of using the print recording system illustrated in FIG. 1, the search processing is performed by the server. In addition, communication processing of the information or the data between the terminal device and the server is necessary.

Effects of Example 2

According to Example 2 of the present invention described above, the same effects as those in Example 1 described above are obtained. Further, in Example 2, the search condition with the priority order is created, and the item with a low priority order is sequentially deleted to be the new search condition, and thus, the input operation of the search condition is simplified, and desired print setting information is easily obtained.

Example 3

Figure 8:
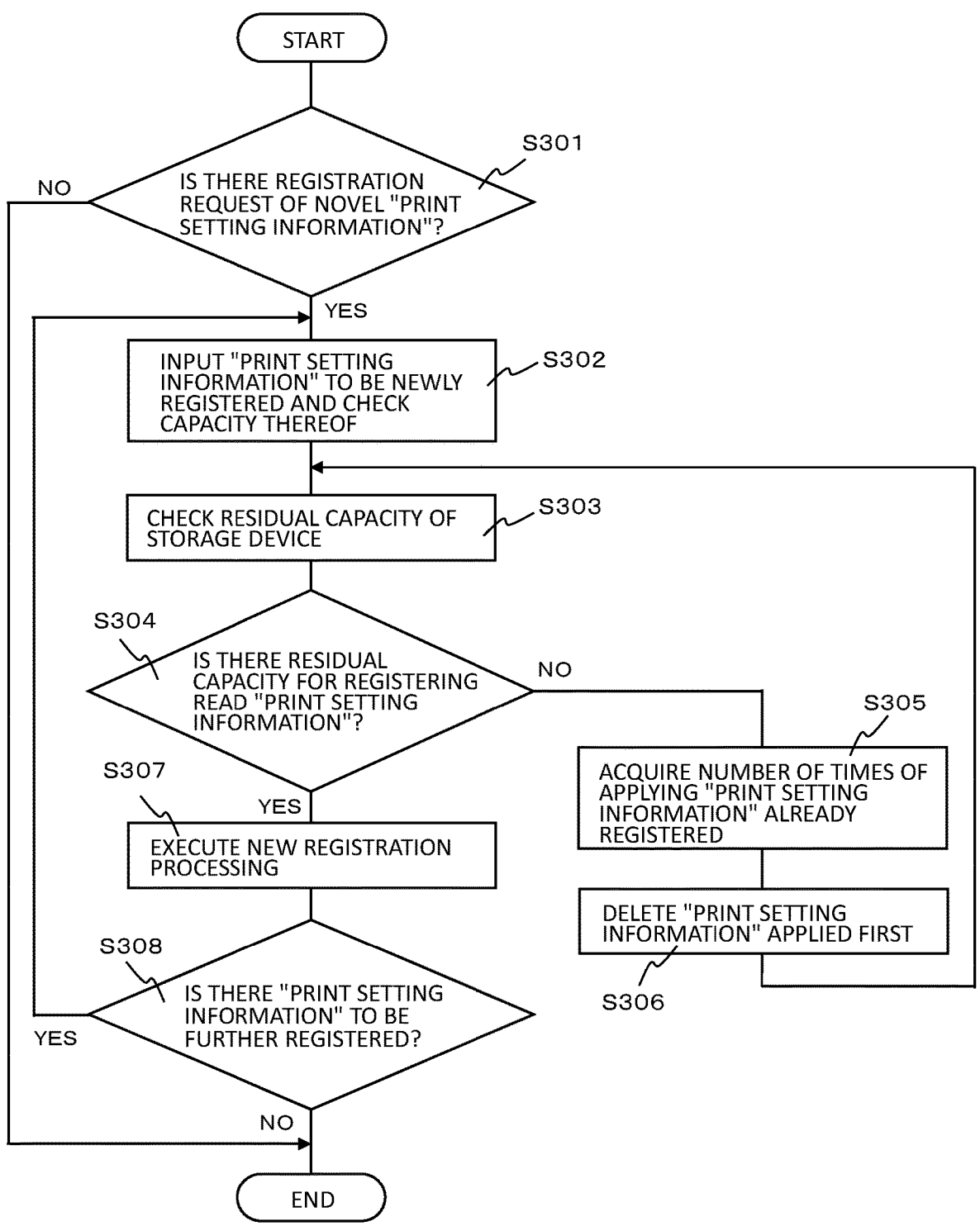
FIG. 8 is a diagram illustrating an operation flow in Example 3 of the present invention.

Next, Example 3 of the present invention will be described by using FIG. 8. FIG. 8 is a diagram illustrating an operation in which new print setting information can be registered in the database. As with Examples 1 and 2 described above, in Example 3 (FIG. 8), the print setting information is searched, and the print setting operation of the print recording device is facilitated by using the print setting information, but Example 3 illustrates only a respect relevant to the operation of registering the set of the plurality of print setting information items as the database. Therefore, in Example 3, the system configuration and the operation of searching the print setting information and of applying the print setting information to the print recording device, described in Examples 1 and 2, have been already described, and thus, the description thereof will be omitted, and only a processing operation in the case of registering the print setting information will be described.

(Description of Operation when Storage Capacity is Insufficient)

In FIG. 8, first, in step S301, it is determined whether or not there is a registration request of novel print setting information. In a case where there is the new registration request from the manipulator, in step S301, it is determined that there is the registration request (YES), and then, the processing proceeds to step S302. In step S301, in a case where there is no registration request (in the case of NO), the processing is ended without being executed. Note that, the print setting information to be newly registered is temporarily retained in the terminal device.

In step S302, the initial print setting information is read in (a plurality of) print setting information (items) that is newly registered, and the capacity is checked. In a case where the processing is ended, the processing proceeds to step S303.

In step S303, a residual capacity (a free area) of the storage device is checked. After the check, the processing proceeds to step S304.

In step S304, the capacity of the print setting information that is obtained in step S302 is compared with the residual capacity that is checked in step S303. In a case where the residual capacity is greater than the capacity of the print setting information, the print setting information can be registered. Therefore, as a result of such comparison, in a case where the read print setting information can be registered (in the case of YES), the processing proceeds to step S308, and new registration is executed.

On the other hand, in step S304, in a case where the capacity of the print setting information is greater than the residual capacity of the storage device (in the case of NO), the new registration is not capable of being executed, and thus, the processing proceeds to step S305.

In step S305, the number of times of actually using (applying) the print setting information that has been already registered in the setting of the print recording device is acquired with reference to the past history. Then, the processing proceeds to step S306.

In step S306, the print setting information with the minimum number of applying times is selected from the number of applying times that is obtained in step S305, and the print setting information is deleted. After such deletion is ended, the processing returns to step S303.

In step S303, the residual capacity of the storage device is checked again. In step S304, the capacity of the print setting information to be registered is compared with the residual capacity of the storage device. In a case where such a comparison result is YES, the processing proceeds to step S307, and the print setting information is registered.

In step S307, new registration processing is performed, and then, the processing proceeds to step S308. In step S308, it is determined whether or not print setting information to be further registered remains. As a result of such determination, in a case where the print setting information to be registered still remains (in the case of YES), the processing returns to step S302, and the processing described above is repeated. In step S308, in a case where the print setting information to be registered does not remain (in the case of NO), it is determined that the new registration processing does not remain, and the processing is ended.

Effects of Example 3

According to Example 3, the same effects as those in the examples described above are obtained, and in a case where there is the print setting information newly registered, the print setting information can also be registered in the storage device. Even in a case where there is no free capacity in the storage device (the residual capacity is small), the novel print setting information can be registered by deleting the print setting information with a small number of calling times.

Example 4

Figure 9:
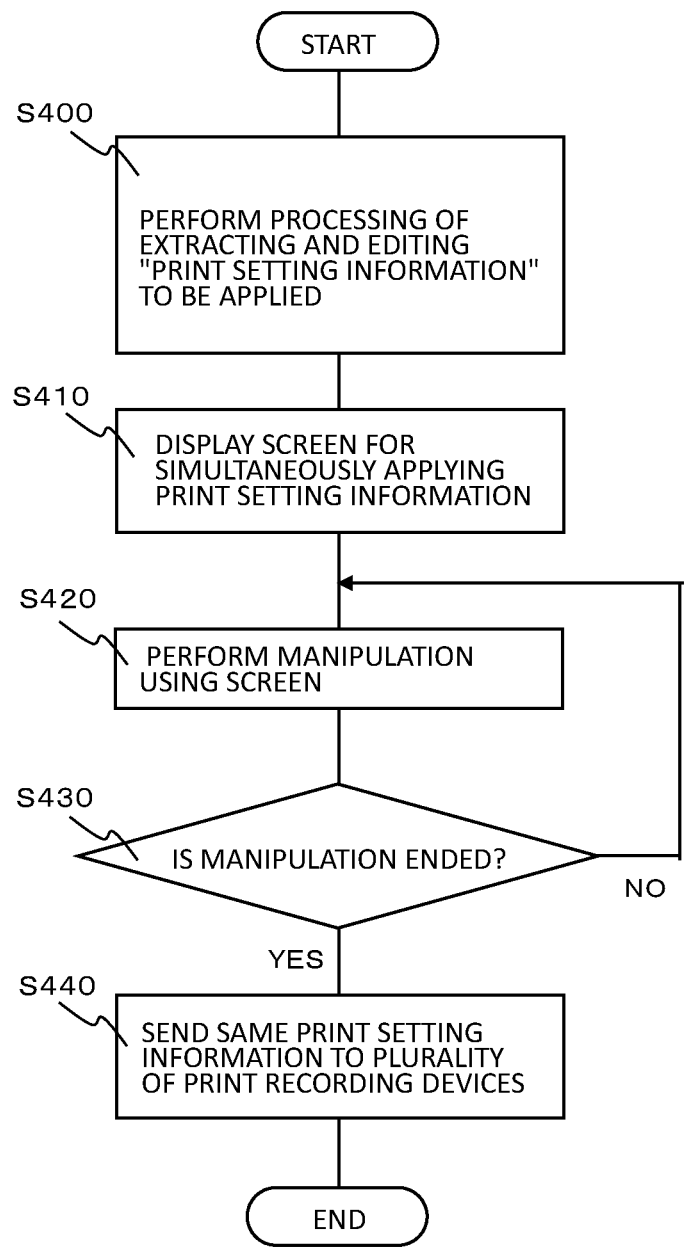
FIG. 9 is a diagram illustrating an operation flow in Example 4 of the present invention.
Figure 10:
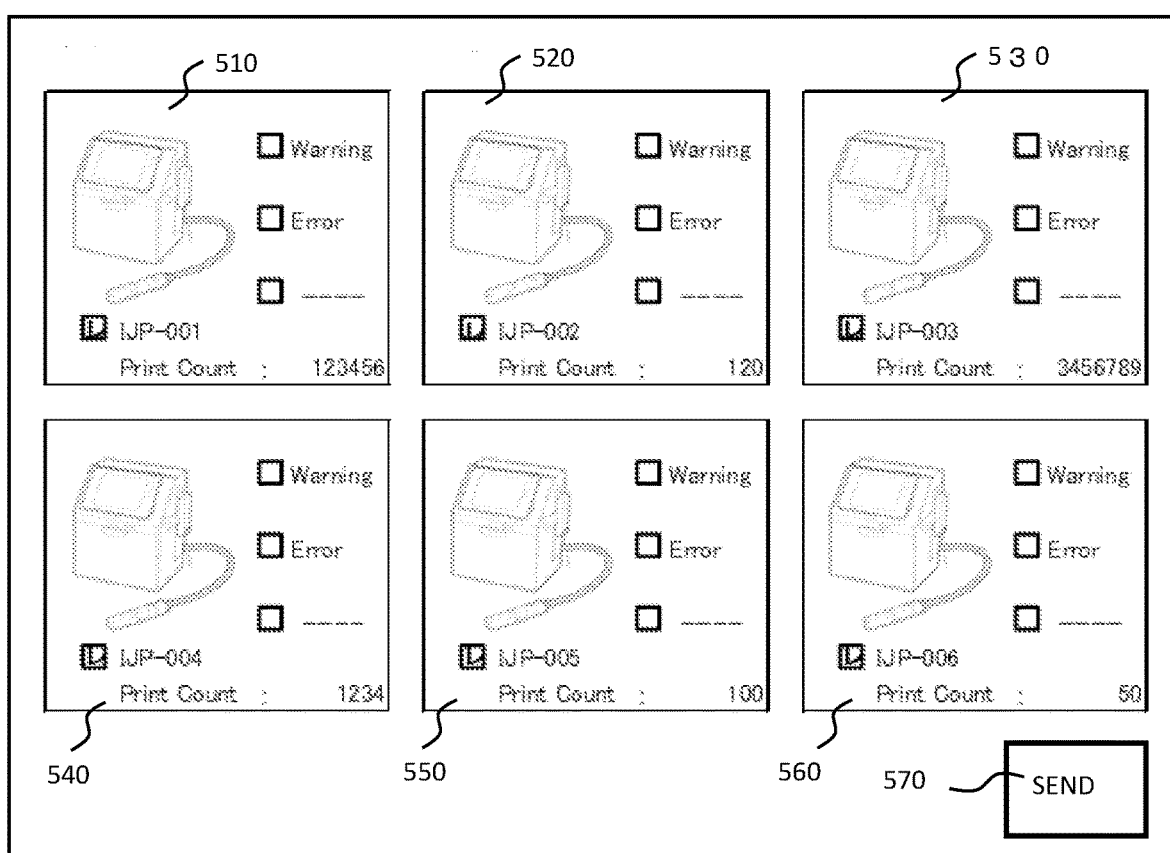
FIG. 10 is a diagram illustrating an example of a screen in Example 4 of the present invention.

Next, Example 4 of the present invention will be described by using FIG. 9 and FIG. 10. FIG. 9 is an operation flowchart thereof. FIG. 10 is a diagram illustrating a display screen that is used at the time of performing the operation of Example 4.

As with Examples 1 to 3 described above, in Example 4, the print setting information is searched, and the print setting operation of the print recording device is facilitated by using the print setting information, but Example 4 relates to an operation in a case where in a print recording system provided with many print storage devices, the print setting data is collectively applied to each of the print storage devices. Therefore, in Example 4, the detailed description of the system configuration and the operation of searching the print setting information and of applying the print setting information to the print recording device, described in Examples 1 and 2, will be omitted, and a respect relevant to the operation in a case where the print setting data is collectively applied to each of the print storage devices will be mainly described.

A display content of a screen in a case where the print setting information is simultaneously applied to a plurality of print recording devices in the system will be described by using FIG. 10 will be described before describing a specific operation content of Example 4 (an operation content of FIG. 9). In FIG. 10, a screen example is illustrated in which six print recording devices represented by 510 to 560 are connected, and buttons for referring to operation states such as a warning, an error, a current state, and the number of print times are displayed in each screen of the print recording devices. In addition, a device to which the print setting information is sent is designated by checking a check button in the vicinity of a device name. After such check, the same print setting information can be collectively sent to the print recording devices by clicking a sending button 570.

Next, returning to FIG. 9, processing of sending and applying the same print setting information to the plurality of print recording devices will be described. In FIG. 9, in step S400, processing of extracting the print setting information to be applied by the search and of performing a necessary edit operation is performed, and such a respect has been described in detail in Example 1 and Example 2 described above. Therefore, here, the details thereof will be omitted. When the processing of step S400 is ended, it is described that the print setting information to be applied (set) to each of the print recording devices is completed.

In step S410 of FIG. 9, a screen for simultaneously applying the print setting information, as illustrated in FIG. 10, is displayed on the display unit 53 of the terminal device 5. After such display is performed, the processing proceeds to step S420. In step S420, the manipulator selects the print recording devices to which the print setting information is simultaneously applied while watching the screen. Such a manipulation content is fetched in the terminal device 5 through the manipulation unit 54.

In step S430, it is determined whether or not the manipulation is ended, and in a case where the manipulation is not ended (in the case of NO), the processing returns to step S420. In step S430, in a case where the manipulation is ended (in the case of YES), the processing proceeds to step S440.

In step S440, the setting using the screen as illustrated in FIG. 10 is ended, and thus, the manipulator clicks the sending button 570 on the screen. Accordingly, the same print setting information can be sent to the plurality of print recording devices in the system.

As described above, according to Example 4, in the system having a configuration in which the plurality of print recording devices are connected, the same print setting information can be collectively sent.

Example 5

Figure 11:
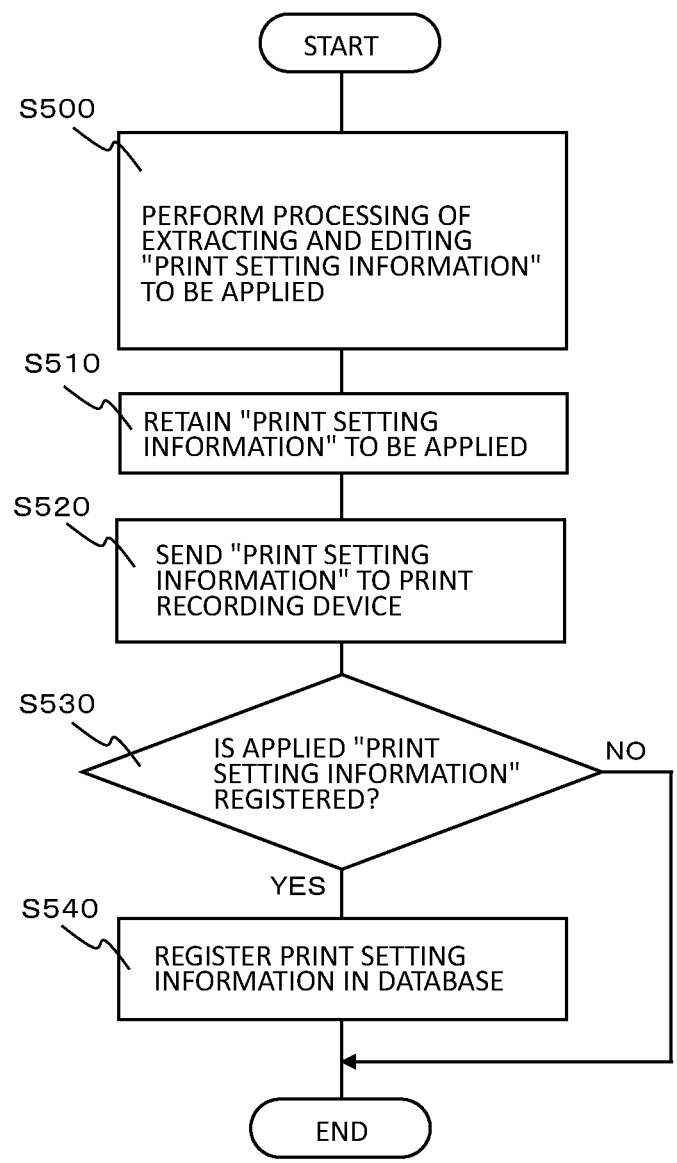
FIG. 11 is a diagram illustrating an operation flow in Example 5 of the present invention.

Next, Example 5 of the present invention will be described by using FIG. 11. FIG. 11 is an operation flowchart thereof.

As with Examples 1 to 4 described above, in Example 5, the print setting information is searched, and the print setting operation of the print recording device is facilitated by using the print setting information, but processing of registering and accumulating the print setting information applied to the print recording device is registered in the database is added. Therefore, in Example 5, the system configuration or the operation of searching the print setting information and of applying the print setting information to the print recording device, described in Examples 1 and 2, will be simply described, and the processing of registering and accumulating the print setting information in the database will be mainly described.

In FIG. 11, first, in step S500, the processing of extracting and editing the "print setting information" to be applied by the search, described above, is performed, and here, such processing will be omitted.

After the processing of step S500 is performed, the processing proceeds to step S510. In step S510, the print setting information is temporarily retained. In step S520, the retained print setting information is sent to each of the print storage devices. The print recording device to which the print setting information is sent executes setting on the basis of the print setting information.

Next, in step S530, it is determined whether or not the applied print setting information is registered. Such determination is performed in the terminal device by the manipulator manipulating the manipulation unit 54 to input the availability of the registration to the terminal device.

In such determination, in a case where the print setting information is registered (in the case of YES), the processing proceeds to step S540. In a case where the print setting information is not registered (in the case of NO), the processing is ended.

In step S540, the print recording information is registered in the database. After such registration, the processing is ended.

As described above, according to Example 5 of the present invention, the print setting information applied to the print recording device can be added to the database as novel data. For this reason, print setting information items used in various environments can be arranged, and the types can be increased.

The present invention is not limited to one example of the present invention described above, but includes various modifications within the scope of the technical idea of the present invention. In addition, the above examples have been described in detail in order to describe the present invention in an understandable way, but are not necessarily limited to those having all of the configurations described above.

REFERENCE SIGNS LIST

1 Server
2 Print recording device
3 Print recording device
4 Print scanning device
5 Terminal device
6 Network line
7 Production line
11 Storage device
12 Arithmetic processing unit
13 Memory
14 Input/output unit
21 Control unit
22 Main body
23 Print head
51 Arithmetic processing unit
52 Memory
53 Display unit
54 Manipulation unit
100 Computer system

The invention claimed is:

1. A print recording system, comprising:
   at least one print recording device; and
   a computer system that includes a database and is capable of sending and receiving data with respect to the print recording device,
   wherein the computer system stores a plurality of print setting information items as the database, searches the print setting information corresponding to a search condition that is input from the database in accordance with the search condition, repeats the search in accordance with a new search condition when the searched print setting information does not match the search condition, and sends the print setting information to the print recording device when the print setting information obtained by the search or the repeated search is applied,
   wherein the print recording device is set on the basis of the sent print setting information, and
   wherein the computer system compares a capacity of new print setting information with a residual capacity of the database when there is a registration request of the new print setting information, registers the new print setting information in the database when the residual capacity is greater than that of the new print setting information, deletes the print setting information having the lowest use frequency from the print setting information that is registered in the database when the residual capacity is less than that of the registration of the new print setting information, and registers the new print setting information in the database after the deletion.

2. The print recording system according to claim 1, wherein the computer system includes:
a server that includes the database and searches the print setting information corresponding to the search condition from the database in accordance with the search condition,
a terminal device that sends the search condition to the server and receives the searched print setting information, sends the new search condition to the server when the print setting information does not match the search condition, receives the print setting information to which the search is repeated in accordance with the new search condition from the server, and sends the print setting information to the print recording device when the search condition obtained by the search or the repeated search is applied, and
a network line that is for sending and receiving data between the server, the terminal device, and the print recording device.

3. The print recording system according to claim 1, wherein the computer system includes:
a storage device that retains the database,
a terminal device that searches the print setting information corresponding to the search condition from the database in accordance with the search condition, repeats the search in accordance with the new search condition when the print setting information does not match the search condition, and sends the print setting information to the print recording device when the search condition obtained by the search or the repeated search is applied, and
a network line that is for sending and receiving data between the terminal device and the print recording device.

4. The print recording system according to claim 1, wherein the computer system creates the print setting information to be sent to the print recording device by using the print setting information obtained by the search or the repeated search.

5. The print recording system according to claim 1, wherein the search condition is determined by being selected from setting items of the print setting information in descending order of a degree of priority.

6. The print recording system according to claim 5, wherein when the print setting information that is searched in accordance with the determined search condition does not match the search condition, a content excluding the setting item having a low degree of priority from the search condition is set to the search condition, and the search is repeated.

7. The print recording system according to claim 1, wherein a plurality of print recording devices are provided, and the computer system collectively sends the print setting information to the plurality of print recording devices.

8. The print recording system according to claim 1, wherein the sent print setting information is registered in the database.

9. A method for controlling a print recording system including at least one print recording device, and a computer system that includes a database and is capable of sending and receiving data with respect to the print recording device,
wherein a plurality of print setting information items are stored in the database,
the method comprising the steps of:
searching the print setting information corresponding to a search condition from the database in accordance with the search condition;
when the searched print setting information does not match the search condition, repeating the search in accordance with a new search condition;
when the print setting information obtained by the search or the repeated search is applied, sending the print setting information is sent to the print recording device;
setting the print recording device on the basis of the print setting information;
when there is a registration request of new print setting information, comparing a capacity of the new print setting information with a residual capacity of the database;
when the residual capacity is greater than that of the new print setting information, registering the new print setting information in the database;
when the residual capacity is less than that of the registration of the new print setting information, deleting the print setting information having the lowest use frequency from the print setting information that is registered in the database; and
registering the new print setting information in the database after the deletion.

10. The method for controlling a print recording system according to claim 9,
wherein the print setting information to be sent to the print recording device is created by using the print setting information obtained by the search or the repeated search.

11. The method for controlling a print recording system according to claim 9,
wherein the search condition is determined by being selected from setting items of the print setting information in order of a degree of priority.

12. The method for controlling a print recording system according to claim 11,
wherein when a search result according to the determined search condition is not coincident with the search condition, a content excluding the setting item having a low degree of priority from the search condition is set to the search condition, and the search is repeated.

13. The method for controlling a print recording system according to claim 9,
wherein a plurality of print recording devices are provided, and the print setting information is collectively sent to the plurality of print recording devices.

14. The method for controlling a print recording system according to claim 9,
wherein the sent print setting information is registered in the database.

* * * * *